United States Patent
Zhdanov

(10) Patent No.: US 12,165,291 B2
(45) Date of Patent: Dec. 10, 2024

(54) JOINT MINIMUM ENTROPY METHOD FOR SIMULTANEOUS PROCESSING AND FUSION OF MULTI-PHYSICS DATA AND IMAGES

(71) Applicant: TechnoImaging, LLC, Salt Lake City, UT (US)

(72) Inventor: Michael S. Zhdanov, Holladay, UT (US)

(73) Assignee: TECHNOIMAGING, LLC, Salt Lake City, UT (US)

( * ) Notice: Subject to any disclaimer, the term of this patent is extended or adjusted under 35 U.S.C. 154(b) by 367 days.

(21) Appl. No.: 17/343,218

(22) Filed: Jun. 9, 2021

(65) Prior Publication Data
US 2022/0012853 A1    Jan. 13, 2022

Related U.S. Application Data

(60) Provisional application No. 63/049,892, filed on Jul. 9, 2020.

(51) Int. Cl.
*G06T 5/73* (2024.01)
*G06T 5/70* (2024.01)

(52) U.S. Cl.
CPC . *G06T 5/73* (2024.01); *G06T 5/70* (2024.01)

(58) Field of Classification Search
CPC .............. G06T 5/003; G06T 5/002; G06T 2207/10072; G06T 2207/30016; G06T 5/50; G01V 1/30; G01V 11/00; G01V 1/28; G01V 99/005; G01V 1/282; G01R 33/5608
See application file for complete search history.

(56) References Cited

U.S. PATENT DOCUMENTS

| | | | |
|---|---|---|---|
| 9,251,585 B2 * | 2/2016 | Azar | A61B 6/502 |
| 2003/0011717 A1 | 1/2003 | McConica | |

(Continued)

OTHER PUBLICATIONS

International Search Report and Written Opinion for PCT/US2021/039952, mailed Dec. 15, 2021, 21 pages.

*Primary Examiner* — Ping Y Hsieh
*Assistant Examiner* — Vaisali Rao Koppolu
(74) *Attorney, Agent, or Firm* — WORKMAN NYDEGGER

(57) ABSTRACT

A method for the simultaneous imaging of different physical properties of an examined medium from multi-physics datasets and for digital enhancement and restoration of multiple multidimensional digital images is described. The method introduces nonnegative joint entropy determined as a joint weighted average of the logarithm of the corresponding density of the model parameters and/or images and/or their attributes. The joint entropy measures are introduced as additional constraints, and their minimization results in enforcing of the order and consistency between the different model parameters and/or multiple images and/or their transforms. The method does not require a priori knowledge about specific physical, analytical, empirical or statistical relationships between the different model parameters and/or multiple images and their attributes, nor does the method require a priori knowledge about specific geometric or structural relationships between different model parameters, images, and/or their attributes.

15 Claims, 3 Drawing Sheets

(56) References Cited

U.S. PATENT DOCUMENTS

| | | |
|---|---|---|
| 2007/0083114 A1 | 4/2007 | Yang et al. |
| 2007/0258706 A1 | 11/2007 | Raskar et al. |
| 2009/0128639 A1 | 5/2009 | Ozluturk |
| 2010/0123807 A1 | 5/2010 | Lee et al. |
| 2012/0062760 A1 | 3/2012 | Klapp et al. |
| 2012/0155785 A1 | 6/2012 | Banner et al. |
| 2013/0063616 A1 | 3/2013 | Ishii et al. |
| 2013/0179130 A1* | 7/2013 | Zhandov ............... G06F 30/00 703/2 |
| 2013/0253874 A1* | 9/2013 | Zhdanov ............... G06F 17/00 702/104 |
| 2014/0207379 A1* | 7/2014 | Bjornemo ............... G01V 3/38 702/2 |
| 2015/0066369 A1* | 3/2015 | Da Costa Paiva ..... G01V 20/00 702/2 |
| 2019/0353819 A1* | 11/2019 | Wang ....................... G01V 3/38 |

* cited by examiner

JOINT MINIMUM ENTROPY METHOD FOR SIMULTANEOUS PROCESSING AND FUSION OF MULTI-PHYSICS DATA AND IMAGES

CROSS-REFERENCE TO RELATED APPLICATIONS

This application claims priority to and benefit of U.S. Provisional Patent Application No. 63/049,892, filed Jul. 9, 2020, which is hereby incorporated by reference in its entirety. This application hereby incorporates the following publications by reference in their entirety: Zhdanov, M. S., 2002, Geophysical inverse theory and regularization problems: Elsevier.

BACKGROUND OF THE INVENTION

1. The Field of the Invention

The present invention relates in general to the simultaneous imaging of different physical properties of an examined medium from multi-physics datasets and to digital enhancement and restoration of multiple multidimensional digital images. In particular, the present invention can be related to image processing, restoration and fusion of multiple unfocused and blurred images of the target, obtained by multi-physics sensors, or by the same set of sensors but at different times. The method, for example, can be applied for data fusion in geophysical exploration, nondestructive testing, and medical imaging. The method can be also applied in optical multiple images processing, for image restoration and fusion in medical, geophysical, astronomical, high definition television, remote sensing, and other industrial applications.

2. The Related Technology

In many industrial applications, multiple and/or multi-physics sensors are used for imaging the targets. The data from different physical sensors, spanning optical, x-rays, ultrasound, MRI, magnetic, electromagnetic, acoustic, gravity, and seismic signals are often used to measure different physical properties of the object. Various physical data usually contain complimentary information about the target. The joint processing, inversion, and data fusion are required to better image the target using the multi-physics data.

Different approaches have been developed to data fusion and reconstruction of the correct images of the target for different applications, including geophysical exploration (Zhdanov, 2019, U.S. Pat. No. 10,242,126), autonomous driving, automated design tool, medical imaging, robotics, and surveillance based on estimation of joint blur point spread function, "PSF" (Agrawal et al., 2012, U.S. Pat. No. 8,229,244 B2), joint image filtering and deconvolution (Hong, 2010, WO 2010/036251 A1), and machine learning methods (e.g., Heide, 2019, US Patent Application No. 2019/0005360 A1).

There are different approaches to the joint inversion of multi-physics data as well. In a case, where the corresponding physical properties are identical or mutually correlated, the joint inversion can explore the existence of this correlation. In a case, where the physical properties are not correlated, but nevertheless have similar geometrical features, the joint inversion can be based on structure-coupled constraints (e.g., Colombo et al., 2010, U.S. Pat. No. 7,805, 250 B2).

A method of joint inversion, which does not require a priori knowledge about specific empirical or statistical relationships between the different model parameters and/or their attributes can be based on using the Gramian constraints which enforce the correlations between the different model parameters or their attributes (Zhdanov, 2019, U.S. Pat. No. 10,242,126).

In some applications, however, the correlation between different physical properties may not exist, but still these properties may represent the same targets. In addition, many existing methods of data fusion and joint image processing and reconstruction have been developed for enhancement of the multiple images captures by the same type of physical sensors (e.g., by photo cameras). There is a need to develop a method for joint processing and fusion of the multiple data generated by the same target and collected by different physical sensors. This is important for integrated analysis of the multi-physics data in medical imaging, remote sensing, geological exploration, through wall imaging, and other industrial applications.

BRIEF SUMMARY

The embodiments disclosed herein are related to systems, methods, and computer readable medium for simultaneous imaging of different physical properties of an examined medium from the simultaneous joint inversion of multiple datasets of physical field/signal measurements and for digital enhancement and restoration of multiple multidimensional digital images. In the systems, methods, and computer readable medium at least one component of at least two physical fields and/or signals or at least two images produced by at least two sensors of corresponding physical fields and/or signals, generated by natural or artificial (controlled) sources, placed at some proximity of the examined medium are measured. The observed data and/or images are recorded by a corresponding recording device. A nonnegative joint entropy functional of at least two model parameters and/or images and/or their attributes is determined as a joint weighted average of the logarithm of the corresponding density of the model parameters and/or images and/or their attributes. Smoothing or focusing stabilizing functionals for producing smooth inverse images or images with sharp boundaries are determined. A parametric functional defined as a linear combination of misfit functionals for at least two datasets or at least two images, smoothing or focusing stabilizing functional, and the joint entropy functional is constructed. Multi-modal model parameters and/or deblurred images, which correspond to the minimum of the parametric functional, are determined by solving a minimization problem for the parametric functional using linear and/or nonlinear optimization methods.

DETAILED DESCRIPTION

Figure 1:
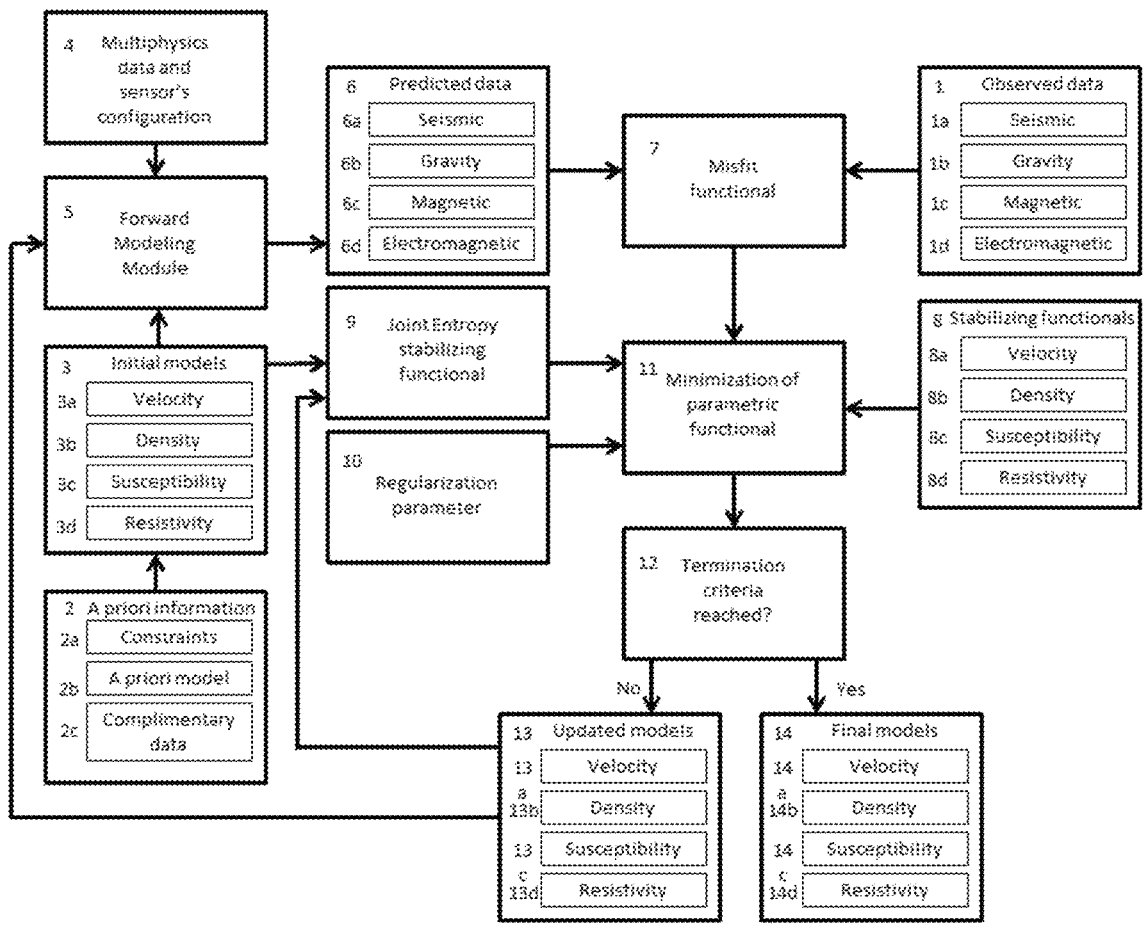
FIG. 1 illustrates an embodiment of the method of imaging of different physical properties of a target, where a data acquisition system with the sensors of the different physical fields and/or signals is located at some proximity of the examined medium.

The embodiments disclosed herein are related to systems, methods, and computer readable medium for simultaneous processing and fusion of multi-physics data using a minimum joint entropy approach.

At least one embodiment of the method disclosed herein can be applied for the simultaneous imaging of different physical properties of the subsurface for mineral, hydrocarbons, geothermal and groundwater exploration.

Another embodiment of this invention can be applied in security and defense applications, e.g., for unexploded ordinance detection, underground structures and tunnel detection, anti-submarine warfare, using multi-physics data, such as thermal, gravity, magnetic, electrical, electromagnetic, and seismic data Another embodiment of the method disclosed herein can be applied in medical imaging for fusion multiple datasets, such as x-ray, magnetic resonance, magnetic tomography, ultrasound, electrical, and radionuclide data.

At least one embodiment of the method disclosed herein is based on calculating a joint entropy functional determined as a joint weighted average of the logarithm of the corresponding density of the model parameters. The joint entropy is the measure of joint disorder or uncertainty in the distribution of the model parameters, $m^{(1)}$, $m^{(2)}$, ..., and $m^{(n)}$. Thus, minimization of this functional results in enforcing of the order or consistency between the different model parameters.

Another embodiment of the method disclosed herein is based on calculating a joint entropy functional of the transformed model parameters and/or different functions of the transformed model parameters. In this case, the joint entropy functional characterizes the joint degree of disorder or uncertainty in the distribution of the different transformed model parameters, $Tm^{(1)}$, $Tm^{(2)}$, ..., and $Tm^{(n)}$, where T is the transform operator and may be chosen as a model weighting operator, a differential operator (e.g., gradient or Laplacian), an absolute value of the model parameters or their differential operators, a Fourier transform, a logarithm, an exponential, or any other transform which emphasize specific properties (attributes) of the model parameters. Thus, minimization of this functional results in enforcing of the order or consistency between the different transformed model parameters and/or their attributes.

In yet another embodiment of the present invention, the structural similarity between different model parameters is based on calculating a nonnegative joint entropy functional of the model parameters and/or different functions of the spatial gradients of the model parameters. In this case, the joint entropy functional characterizes the degree of joint disorder of the spatial gradients of the different model parameters, $\nabla m^{(1)}$, $\nabla m^{(2)}$, ..., and $\nabla m^{(n)}$. Thus, minimization of this functional results in enforcing of the structural (geometric) similarity between the different images by minimizing the joint entropy.

More specifically, a method of the present disclosure is based on measuring at least two datasets representing different model parameters of the target; determining a nonnegative joint entropy functional of at least two model parameters and/or their attributes; determining another joint entropy functional of at least two transformed model parameters and/or their attributes; determining another joint entropy functional of the spatial gradients of the model parameters and/or their attributes; determining smoothing or focusing stabilizing functionals for producing smooth inverse images or the images with sharp boundaries as described in Zhdanov, 2002 [Geophysical inverse theory and regularization problems, Elsevier]; as described constructing a parametric functional defined as a linear combination of the misfit functionals for at least two datasets, smoothing or focusing stabilizing functional, and at least one of the joint entropy functionals introduced above; determining the model parameters, which correspond to the minimum of the parametric functional, by solving a minimization problem for the parametric functional using linear and/or nonlinear optimization methods.

In a method of the present disclosure, external constraints on the model parameters, including but not limited to a priori models and/or upper and/or lower bounds, can be applied to the joint inversion and may consist of a priori knowledge of the model parameters and/or their attributes (e.g., from well logs or laboratory analysis of rock samples, or from another known data/images), and the interpretative knowledge about model parameters and/or their attributes (e.g., from geological, medical, physical interpretation).

In methods of the present disclosure, the dimensionality of the model parameters and/or their attributes may be one-dimensional, two-dimensional, three-dimensional, or four-dimensional.

In at least one embodiment of a method disclosed herein, the geophysical data are inclusive of any combination of thermal and/or gravity and/or magnetic and/or electrical and/or electromagnetic and/or seismic and/or nuclear data.

At least one embodiment of a method disclosed herein, can be applied for the imaging of geological formations and/or man-made objects for mineral, hydrocarbon, geothermal and groundwater exploration, in-situ mining, hydrocarbon, geothermal and groundwater resource monitoring, unexploded ordinance (UXO), improvised explosive device (IED), tunnel, and underground facility (UGF) detection, anti-submarine warfare, geosteering, bathymetry mapping, ice thickness mapping, and environmental monitoring.

At least one embodiment of this method can be used in geophysical exploration for mineral, hydrocarbon, geothermal, and groundwater resources, and solid earth processes.

At least one embodiment of this method can be used in geophysical monitoring for in-situ mining, hydrocarbon, geothermal, and groundwater resources, and solid earth processes.

At least one embodiment of this method can be used for detecting UXO, IEDs, tunnels, and UGFs.

At least one embodiment of this method can be used for geosteering.

At least one embodiment of this method can be used for formation evaluation and/or logging-while-drilling (LWD) and/or measurement-while-drilling (MWD) and/or imaging-while-drilling (IWD).

At least one embodiment of this method can be used for mapping bathymetry in shallow and/or temporal and/or turbid water.

At least one embodiment of this method can be used for mapping ice thickness.

At least one embodiment of this method can be used for environmental monitoring, such as salinity, acid mine drainage, and pollution plumes.

At least one embodiment of this method can be used for anti-submarine warfare.

In at least one embodiment of a method disclosed herein, the medical data are inclusive of any combination of x-ray and/or magnetic resonance and/or ultrasound and/or electrical and/or magnetic and/or radionuclide data.

At least one embodiment of a method disclosed herein, can be applied to the imaging of bodies.

At least one embodiment of a method disclosed herein, can be applied to the imaging of the human brain.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein reference numerals designate corresponding parts in the various figures. It is to be expressly understood, however, that the drawings are for the purpose of illustration and description only, and are not intended as a definition of the limits of the invention. As used in the specification and in the claims, the singular form of "a", "an" and "the" include plural referents unless the context clearly dictates otherwise. Attention is first given to FIG. 2, which illustrates an embodiment of a data acquisition system 15 that may be used to practice the embodiments disclosed herein. The data acquisition system 15 may include one or more sensors of different physical fields and/or signals 16 that are located at some proximity of an examined medium 17. In one embodiment, the sensors 16 may be arranged as an array on the surface or within the examined medium 17. It will be appreciated that the sensors 16 may be arranged in any reasonable manner. In some embodiments, the sensors 16 may be seismic, electric, magnetic, gravity, acoustic, and/or temperature field sensors or any combination thereof. In other embodiments, the sensor 16 may be optical, electromagnetic, elastic, and/or radio wave signal sensors or any combination thereof. In still other embodiments, the sensor 16 may be x-ray, magnetic resonance, ultrasound, electrical and/or radionuclide sensors. It will be appreciated that the sensors 16 may be any reasonable type of sensor or combination of sensors as circumstances warrant.

In one embodiment, the sensors 16 may record at least one component of corresponding physical fields and/or signals, generated as a response from the examined medium 17 to the natural or artificial (controlled) sources. In some embodiments a processor 18, which may include, for example, a central processing unit, may operate the data acquisition system. The processor 18 may include a recording device 19 for recording the data measured or obtained by the sensor One embodiment of a method of simultaneous imaging different physical properties of an examined medium from the joint inversion of observed data from multiple geophysical field measurements is shown in FIG. 1. Observed geophysical data 1 may include but not be limited to seismic 1a, gravity 1b, magnetic 1c, and electromagnetic 1d data, and may be measured above and/or on the surface of and/or within the subsurface. A priori information about the subsurface 2 may include constraints on the physical properties 2a, a priori model of the target 2b, and any other complimentary data 2c. A priori information about the subsurface 2 may be used to construct initial models 3 for each of the different physical properties, such as seismic compressional and/or shear velocity 3a, density 3b, magnetic susceptibility and/or magnetization 3c, and resistivity and/or conductivity 3d. Emulating the geophysical survey design and system parameters 4, a forward modeling module 5 can be used to calculate the predicted geophysical data 6 including but not limited to seismic 6a, gravity 6b, magnetic 6c, and electromagnetic 6d data.

A misfit functional 7 calculates the misfit and residual vector between at least two observed geophysical data 1 and predicted geophysical data 6. Stabilizing functionals 8 are calculated for at least two model parameters and/or their attributes (such as velocity 8a, density 8b, susceptibility 8c, and resistivity 8d data), and may include any smooth or focusing stabilizing functions such as Laplacian, minimum gradient, minimum norm, minimum support, minimum gradient support, or minimum gradient support.

A joint entropy functional 9 is calculated as the nonnegative joint weighted average of the logarithm of at least two model parameters and/or their attributes or of the density functions of at least two model images; or as the nonnegative joint weighted average of the logarithm of at least two transformed model parameters and/or their attributes, or as joint weighted average of the logarithm of the spatial gradients of the model parameters and/or their attributes or of the density functions gradients of at least two model images. A regularization parameter 10 is predetermined or calculated using standard principles of regularization theory.

A parametric functional is constructed as the linear combination of the misfit functional, at least one stabilizing functional introduced above, and at least one joint entropy stabilizing functional introduced above. In some embodiments, multi-modal model parameters are determined by minimizing the parametric functional. The parametric functional may be minimized using a linear or nonlinear optimization method 11, such as a regularized conjugate gradient method. The termination criteria of the joint inversion 12 is evaluated, such as a predetermined misfit being achieved. If the termination criteria are not satisfied, the model parameters are updated with the multi-modal model parameters as updated model parameters 13 (e.g., updated model parameters velocity 13a, density 13b, susceptibility 13c, and resistivity 13d), and the aforementioned joint inversion process is reiterated. This process is repeated until the termination criteria are satisfied. If the termination criteria are satisfied, the model parameters are updated as final model parameters 14 (e.g., final model parameters velocity 14a, density 14b, susceptibility 14c, and resistivity 14d), and the joint inversion process is terminated.

Figure 2:
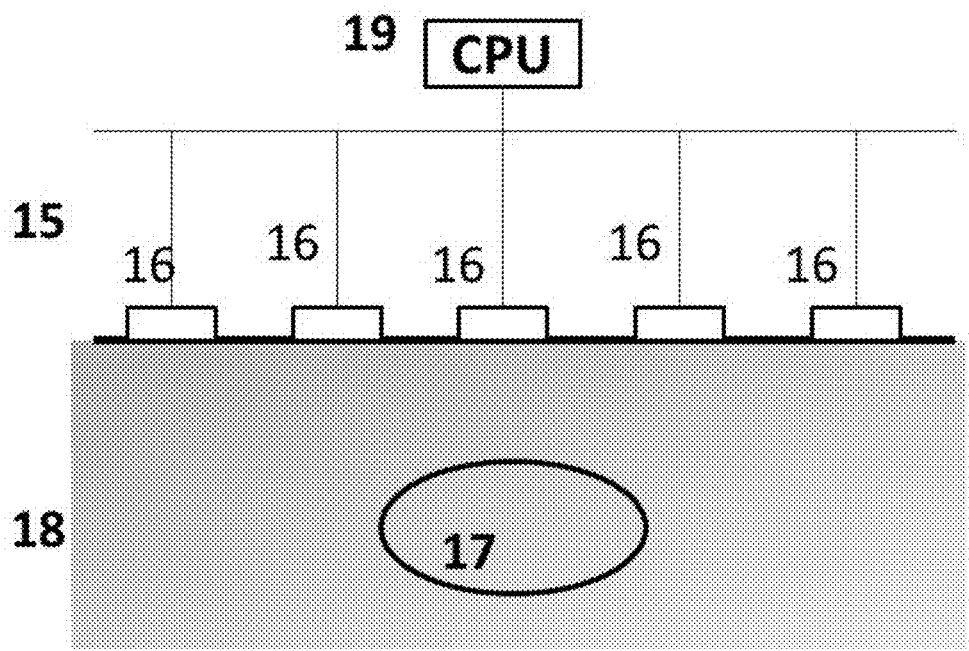
FIG. 2 illustrates a data acquisition system according to the embodiments disclosed herein.

In some embodiments, the simultaneous imaging of different physical properties of an examined medium from the joint inversion of observed data from multiple geophysical field measurements may be achieved using the processor 19 of FIG. 2, which may include, for example, a central processing unit, a storage system, and a communications system. The processor 19 may be distributed across one or more processors.

In at least one embodiment of this invention, the method can be used in image processing, and, in particular, for restoration and fusion of multiple unfocused and blurred images of the target, obtained by multi-physics sensors, or by the same set of sensors but at different times. The method, for example, can be applied for optical multiple images processing, for image restoration and fusion in medical, geophysical, astronomical, high definition television, remote sensing, and other industrial applications.

This embodiment of the method disclosed herein is based on calculating a joint entropy functional which is the measure of joint disorder or uncertainty in the deblurred images. Thus, minimization of this functional results in enforcing of the order or consistency between the different deblurred images.

Example 1

The following is an example of at least some of the principles of the minimum entropy method of simultaneous processing and restoration of multiple digital images of the target. It is not intended thereby to limit the scope of the disclosure to any particular theory of operation or to any field of application.

In general, we can consider the modeling of multiple physical fields as the operator relationships:

$$A^{(i)}(m^{(i)})=d^{(i)}, \; i=1,2,\ldots,n, \quad (1)$$

where, in a general case, $A^{(i)}$ is a nonlinear operator, $m^{(i)}$ are the unknown model parameters which form a complex Hilbert space of model parameters, M, with an $L_2$ norm defined by the corresponding inner product:

$$(m^{(i)},m^{(j)})_M = \int_S m^{(i)}(r)m^{(j)*}(r)dv, \|m^{(i)}\|_M^2 = (m^{(i)},m^{(i)})_M, \quad (2)$$

In equation (2), r is a radius vector defined on an observation surface, S; the asterisk * denotes the complex conjugate; and $d^{(i)}$ are different observed data that belong to a complex Hilbert space of data, D, with an $L_2$ norm defined by the corresponding inner product:

$$(d^{(i)},d^{(j)})_D = \int_S d^{(i)}(r)d^{(j)*}(r)dv, \|d^{(i)}\|_D^2 = (d^{(i)},d^{(i)})_D. \quad (3)$$

For the solution of a nonlinear inverse problem (1), we introduce the following parametric functional with the minimum entropy stabilizers:

$$P^\alpha(m^{(1)},m^{(2)},\ldots,m^{(n)}) = \sum_{i=1}^{n}\|A^{(i)}(m^{(i)})-d^{(i)}\|_D^2 + \alpha c_1 \sum_{i=1}^{n} S^{(i)} + \alpha c_2 S_{JME} \rightarrow \min, \quad (4)$$

where $\alpha$ is the regularization parameter, $S^{(i)}$ are smoothing or focusing stabilizing functionals, $S_{JME}$ is the joint minimum entropy stabilizing functional for transformed model parameters defined as a joint weighted average of the logarithm of the corresponding density of the transformed model parameters $$S_{JME} = -\int_V \frac{(\sum_{i=1}^{n}|Tm^{(i)} - Tm_{apr}^{(i)}|+\beta)}{Q_J} \log \frac{(\sum_{i=1}^{n}|Tm^{(i)} - Tm_{apr}^{(i)}|+\beta)}{Q_J} dv. \quad (5)$$

It is implied that the transform operator, T, may be the identity operator or a gradient operator, and $c_1$ and $c_2$ are the weighting coefficients determining the weights of the different stabilizers in the parametric functional.

To minimize parametric functional (4), one can construct a regularized conjugate gradient (RCG) method, which for the $k^{th}$ iteration can be summarized as:

$$r_k = A(m_k)-d, \quad (6a)$$

$$l_k^\alpha = l^\alpha(m_k), \quad (6b)$$

$$\beta_k^\alpha = \|l_k^\alpha\|^2/\|l_{k-1}^\alpha\|^2, \quad (6c)$$

$$\tilde{l}_k^\alpha = l_k^\alpha + \beta_k^\alpha \tilde{l}_{k-1}^\alpha, \quad (6d)$$

$$\tilde{s}_k^\alpha = (\tilde{l}_k^\alpha, l_k^\alpha)/\{\|\tilde{F}_{m_k}\tilde{l}_k^\alpha\|^2 + \alpha\|W\tilde{l}_k^\alpha\|^2\}, \quad (6e)$$

$$m_{k+1} = m_k - \tilde{s}_k^\alpha \tilde{l}_k^\alpha, \quad (6f)$$

where $d=(d^{(1)}, d^{(2)},\ldots, d^{(n)})$ is the vector of observed data, $m_k = (m_k^{(1)}, m_k^{(2)},\ldots, m_k^{(n)})$ is the vector of model parameters, $A(m_k)$ is the vector of predicted data, and $l_k^\alpha$ is the vector of the regularized direction of steepest ascent of the parametric functional (4), as described in Zhdanov, 2002 [Geophysical inverse theory and regularization problems, Elsevier].

Adaptive regularization may be implemented to decrease the regularization parameter as the iterative process (6) proceeds until it is either terminated when the misfit reaches a desired level:

$$\varphi(m_{k+1}) = \|r_{k+1}\|_D^2 = \delta_d, \quad (7)$$

or a maximum number of predetermined iterations is reached, or the misfit fails to decrease by a predetermined threshold between iterations.

Example 2

Figure 3A:
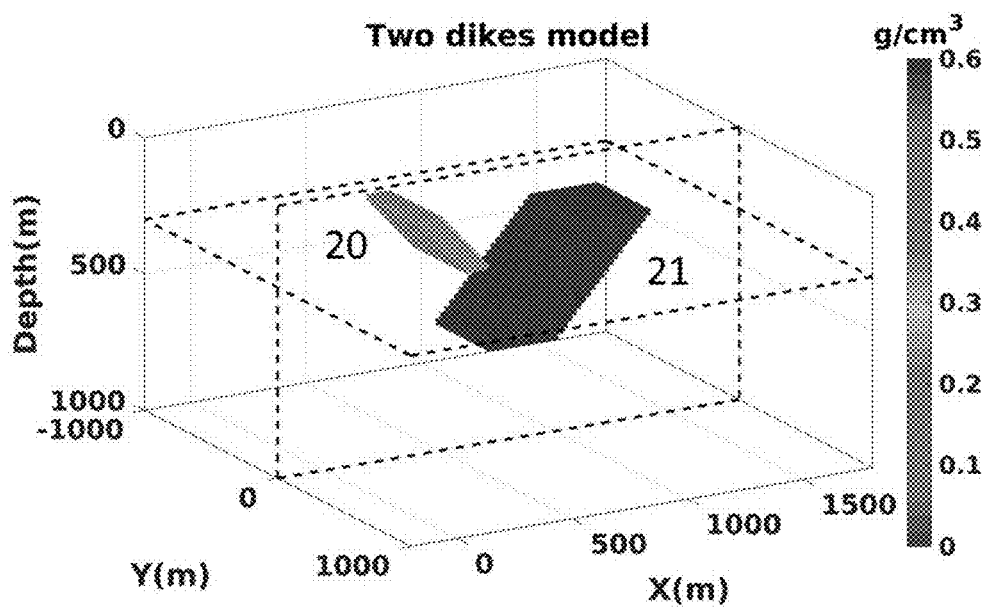
FIGS. 3a-3b illustrate an example of a joint minimum entropy method of simultaneous imaging of the density and susceptibility parameters of the subsurface from the observed gravity and magnetic data.
Figure 3B:
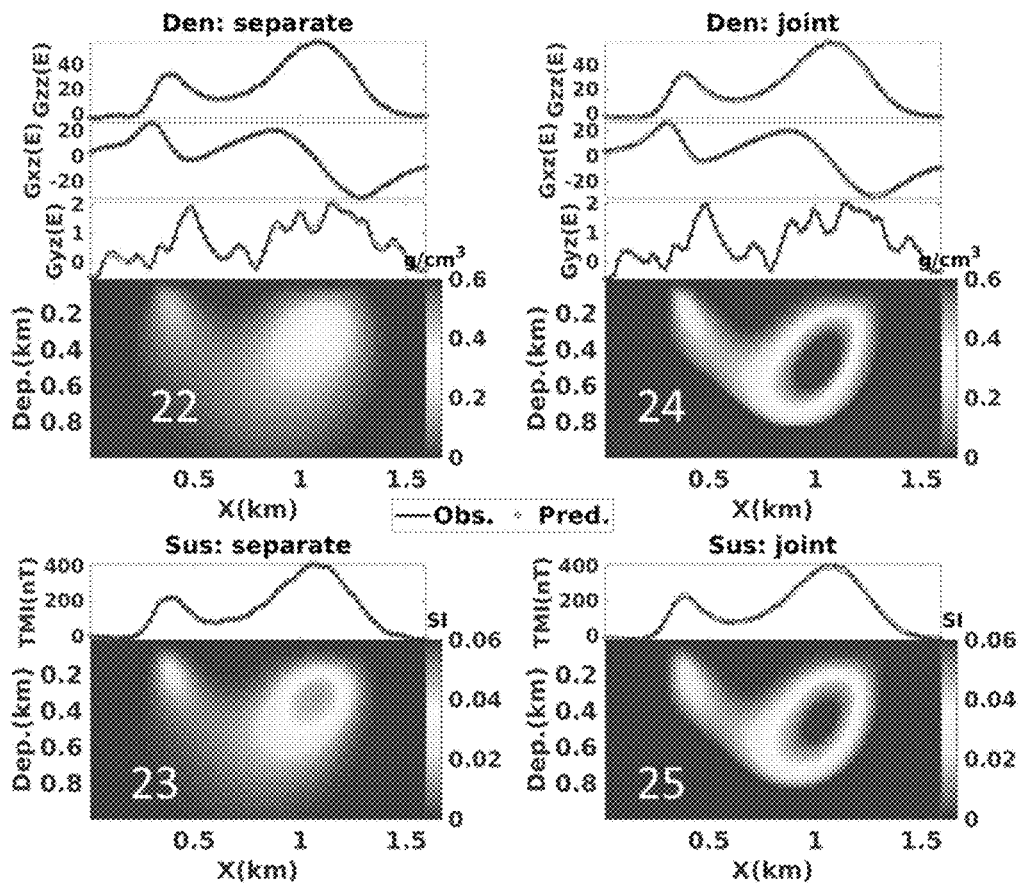

The following is a synthetic example of the simultaneous imaging different physical properties of an examined medium from the joint inversion of observed gravity and magnetic data (FIGS. 3a-3b).

FIG. 3a shows a 3D view of the model, which consists of two dipping dikes with the anomalous density and magnetic susceptibility of the left dike 20 equal to 0.35 g·cm$^{-3}$ and 0.035 SI, respectively, and those of the right dike 21 is 0.6·g·cm$^{-3}$ and 0.06 SI, respectively. Both dikes are located in an otherwise homogeneous host with zero background density and magnetic susceptibility.

Synthetic gravity and magnetic data (total magnetic intensity, TMI) were simulated for this model with 20 m receiver interval and 20 m line spacing. The TMI data were computed based on a middle latitude situation in the northern hemisphere, with the total magnetic field intensity of 57,628 nT, the magnetic inclination of 89 degrees, and declination of 8.7 degrees. The synthesized data were contaminated with a 3% Gaussian noise.

The synthetic gravity and magnetic data were a) separately inverted, and b) jointly inverted using minimum joint entropy constraints on the model parameters, with no other a priori information used. The density model 22 and susceptibility model 23, recovered from standalone separate inversions produced diffused and unclear images of the dikes. In other words, the standalone inversions do not recover the true physical properties of an examined medium correctly. The density model 24 and the susceptibility model 25 produced by minimum joint entropy inversion recover accurately the parameters of the true models.

Example 3

The following is an example of at least some of the principles of the minimum entropy method of simultaneous processing and restoration of multiple digital images of the target. It is not intended thereby to limit the scope of the disclosure to any particular theory of operation or to any field of application.

One of the embodiments disclosed herein is related to systems, methods, and computer readable medium for simultaneous digital image restoration and enhancement using a minimum joint entropy approach. In a multi sensor imaging system at least two different images of the same target are generated. These images are collected by different physical and/or electron-optical devices with different blurring operators:

$$B^{(i)}(m^{(i)}) = d^{(i)}, \; i=1,2,\ldots,n, \quad (8)$$

where $d^{(i)}$, (i=1, 2, 3, ..., N) are different degraded (blurred) images (which may correspond to different types of sensors), and $m^{(i)}$ (i=1, 2, 3, ..., N) are the original (ideal) images of physical properties of the target, and $B^{(i)}$ are the linear blurring operators of the multisensor imaging system, corresponding to different sensors, respectively. In this method of the present invention, the combined misfit functional, $\varphi$, equal to combined square norm of difference between the observed degraded images, $d^{(i)}$, and numerically predicted degraded image $d_{pr}^{(i)}$ corresponding to the enhanced ideal images, $m_e^{(i)}$, is calculated:

$$\varphi = \Sigma_{i=1}^n \|B^{(i)}(m_e^{(i)}) - d^{(i)}\|_D^2, \quad (9)$$

where $\|\ldots\|$ denotes $L_2$ norm. Note that, the original image, as well as the blurred (degraded) image, can be defined in a plane (2-D images: m=m(x,y), d=d(x,y)) or in a volume (3-D images: m=m(x,y,z), d=d(x,y,z)), or it could be a function of time as well (4-D images: m=m(x,y,z,t), d=d(x,y,z,t)).

In the systems, methods, and computer readable medium at least two images produced by at least two sensors of corresponding physical fields and/or signals, generated by natural or artificial (controlled) sources, placed at some proximity of the examined medium are measured, or by the same sensors but at different time moments. The images recorded by a corresponding recording device. A nonnegative joint entropy functional determined as a joint weighted average of the logarithm of the corresponding density of at least two images and/or their attributes is determined. Smoothing or focusing stabilizing functionals for producing smooth inverse images or images with sharp boundaries are also determined. A parametric functional defined as a linear combination of misfit functionals for at least two datasets, smoothing or focusing stabilizing functional, and the joint entropy functional is constructed. Deblurred images, which correspond to the minimum of the parametric functional, are determined by solving a minimization problem for the parametric functional using linear and/or nonlinear optimization methods.

The restored (enhanced) image is selected from the class of possible ideal images by minimization of the joint entropy of the deblurred images, which is given by the following quantity:

$$S_{JME} = -\int_V \frac{(\Sigma_{i=1}^n |m_e^{(i)} - m_{apr}^{(i)}| + \beta)}{Q_J} \log \frac{(\Sigma_{i=1}^n |m_e^{(i)} - m_{apr}^{(i)}| + \beta)}{Q_J} dv, \quad (10)$$

where $Q_J = \int_V (\Sigma_{i=1}^n |m_e^{(i)} - m_{apr}^{(i)}| + \beta) dv$, and $\beta \ll 1$ is a small constant.

An alternative approach to simultaneous image restoration and enhancement can be based on selecting the restored (enhanced) images from the class of possible ideal images by minimization of the joint entropy of the gradients of deblurred images, given by the following formula:

$$S_{JMEG} = -\int_V \frac{(\Sigma_{i=1}^n |\nabla m_e^{(i)}| + \beta)}{Q'_J} \log \frac{(\Sigma_{i=1}^n |\nabla m_e^{(i)}| + \beta)}{Q'_J} dv, \quad (11)$$

where $$Q'_J = -\int_V \left( \sum_{i=1}^n |\nabla m_e^{(i)}| + \beta \right) dv,$$

and $\nabla m_e^{(i)}$ describes the spatial gradient of the image parameters.

The principles of joint image enhancement, sharpening, and fusion can be described as follows. We introduce new constraints (stabilizers) which jointly minimize the entropy of the deblurred images or their gradients: the joint minimum entropy, $S_{JME}$, and joint minimum entropy gradient, $S_{JMEG}$, constraints. We demonstrate that these new constraints in combination with the penalization function helps to generate a stable solution of the system of linear equations (8) describing the multi sensor imaging system processing. This approach represents a joint minimum entropy method for simultaneous deblurring and fusion of multiple images of the target.

The solution of a linear inverse problem (8) is based on minimization of parametric functional with the minimum entropy stabilizers:

$$P^\alpha(m^{(1)}, m^{(2)}, \ldots, m^{(n)}) = \Sigma_{i=1}^n \|A^{(i)}(m^{(i)}) - d^{(i)}\|_D^2 + \alpha c_1 \Sigma_{i=1}^n S^{(i)} + \alpha c_2 S_{JME} + c_{23} S_{JMEG} \to \min, \quad (4)$$

where $\alpha$ is the regularization parameter, $S^{(i)}$ are smoothing or focusing stabilizing functionals, $S_{JME}$ and $S_{JMEG}$ are joint minimum entropy and joint minimum entropy gradient functionals, respectively. Coefficients $c_1$, $c_2$, and $c_3$ are the weighting coefficients determining the weights of the different stabilizers in the parametric functional.

Example 4

Figure 4:
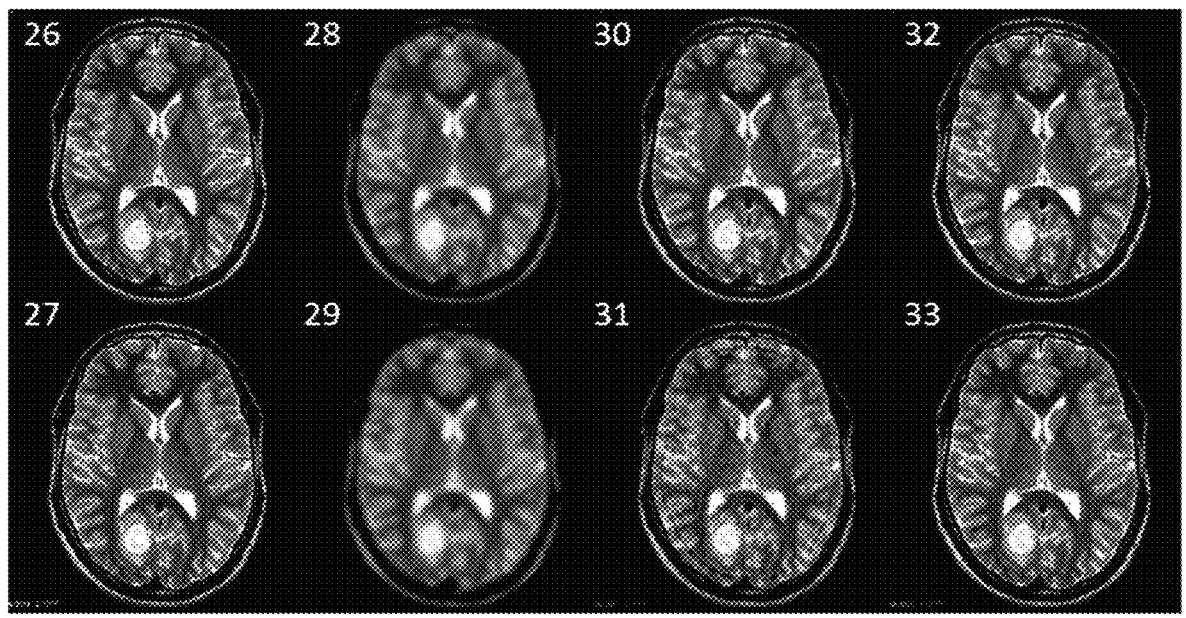
FIG. 4 illustrates examples of joint reconstruction of brain MRI images using joint minimum entropy method of this invention.

The following is an example of reconstruction of brain MRI images using joint minimum entropy method of this invention (FIG. 4). The original (ideal) MRI images are shown in panels 26 and 27. In real medical applications, these images could be taken on two different occasions and can be variously degraded by deviating conditions of MRI testing. The examples of particular degraded MRI images are shown in panels 28 and 29.

We first reconstructed the images separately using the deblurring method of the present invention with a separate minimum entropy stabilizers calculated for each image individually. The reconstructed images are shown in panels 30 and 31. We can see an improvement in these images in comparison with the blurred images 28 and 29; however, some many important details of the brain structure are still diffused and unfocused in the images produced by deblurring process applied to degraded images 28 and 29 separately.

The degraded images 28 and 29 were also jointly reconstructed using the joint minimum entropy method of the present invention. The results of joint image enhancement and deblurring, 32 and 33, show significant improvement in resolution and quality of the deblurred images, which become almost undistinguishable from the original MRI images 26 and 27. This example demonstrates the advantage of joint minimum entropy reconstruction of the deblurred images in comparison with the conventional separate image enhancement.

The method can be implemented numerically on general purpose computer, or it may be performed using dedicated hardware specially designed to solve constraint minimization problems.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical non-transitory storage media. Computer-readable media that carry computer-executable instructions are transmission media. Thus, by way of example, and not limitation, embodiments of the invention can comprise at least two distinctly different kinds of computer-readable media: physical non-transitory storage media and transmission media.

Physical non-transitory storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for simultaneous imaging of different physical properties of an examined medium from multi-physics datasets, the method comprising:
   receiving at least one component of at least two physical fields and/or signals with at least two sensors of corresponding physical fields and/or signals, generated by natural or artificial sources, placed at some proximity of the examined medium and recording observed data by a corresponding recording device;
   determining a nonnegative joint entropy functional which is a measure of joint disorder or uncertainty in the distribution of at least two model parameters and/or their attributes corresponding to a plurality of measured parameters, wherein the nonnegative joint entropy functional is the measure of joint disorder or uncertainty in the distribution of the at least two model parameters and/or their attributes and is the measure of joint disorder or uncertainty in a distribution of spatial gradients of the at least two model parameters and/or their attributes;
   determining smoothing or focusing stabilizing functionals for producing smooth inverse images or images with sharp boundaries;
   determining misfit functionals between the plurality of measured parameters and corresponding predicted geophysical data;
   constructing a parametric functional, the parametric functional being a linear combination of the misfit functionals, the smoothing or focusing stabilizing functionals, and the nonnegative joint entropy functional; and
   determining multi-modal model parameters corresponding to a minimum of the parametric functional by solving a minimization problem for the parametric functional.

2. The method of claim 1 wherein the at least two sensors comprise a plurality of sensors arranged in an array on the surface or within the examined medium.

3. The method of claim 2, wherein the plurality of sensors include seismic, electric, magnetic, gravity, acoustic, and temperature field sensors.

4. The method of claim 2, wherein the plurality of sensors include optical, electromagnetic, elastic, and radio waves signal sensors.

5. The method of claim 2, wherein the plurality of sensors include x-ray, magnetic resonance, ultrasound, electrical, and radionuclide sensors.

6. The method of claim 1, wherein the measured data are input to a processor, and the processor includes executable instructions to:

a. numerically calculate the nonnegative joint entropy functional of the at least two model parameters and/or their attributes;
b. numerically calculate the smoothing or focusing stabilizing functionals for producing smooth inverse images or the images with sharp boundaries;
c. numerically calculate the parametric functional defined as a linear combination of the misfit functionals for at least two datasets, the smoothing or focusing stabilizing functional, and the nonnegative joint entropy functional introduced above; and
d. numerically determine the multi-modal model parameters, which correspond to the minimum of the parametric functional, by solving the minimization problem for the parametric functional using linear and/or nonlinear optimization methods.

7. A physical non-transitory computer readable medium having stored thereon computer executable instructions that when executed by a processor cause a computing system to perform a method for simultaneous imaging of different physical properties of an examined medium from simultaneous joint inversion of multiple datasets of physical field/signal measurements, the method comprising:
a. measuring at least one component of at least two physical fields and/or signals with at least two sensors and recording observed data by a corresponding recording device;
b. determining a nonnegative joint entropy functional which measures a degree of disorder of at least two model parameters and/or their attributes, wherein the nonnegative joint entropy functional is the measure of joint disorder or uncertainty in the distribution of at least two model parameters and/or their attributes and is the measure of joint disorder or uncertainty in a distribution of spatial gradients of the at least two model parameters and/or their attributes;
c. determining smoothing or focusing stabilizing functionals for producing smooth inverse images or images with sharp boundaries;
d. constructing a parametric functional defined as a linear combination of misfit functionals for at least two datasets, the smoothing or focusing stabilizing functional, and the nonnegative joint entropy functional;
e. determining multi-modal model parameters, which correspond to a minimum of the parametric functional, by solving a minimization problem for the parametric functional using linear and/or nonlinear optimization methods.

8. A system for simultaneous imaging of different physical properties of an examined medium from simultaneous joint inversion of multiple datasets of physical field/signal measurements comprising:
one or more sensors; and
a computing system, the computing system comprising:
a processor; and
one or more physical non-transitory computer readable medium having computer executable instructions stored thereon that when executed by the processor, cause the computing system to perform the following:
measure at least one component of at least two physical fields and/or signals with the one or more sensors and recording observed data by a corresponding recording device;
determine a nonnegative joint entropy functional which measures a degree of disorder of at least two model parameters and/or their attributes, wherein the nonnegative joint entropy functional is the measure of joint disorder or uncertainty in the distribution of the at least two model parameters and/or their attributes and is the measure of joint disorder or uncertainty in a distribution of spatial gradients of the at least two model parameters and/or their attributes;
determine smoothing or focusing stabilizing functionals for producing smooth inverse images or images with sharp boundaries;
construct a parametric functional defined as a linear combination of misfit functionals for at least two datasets, the smoothing or focusing stabilizing functional, and the nonnegative joint entropy functional; and
determine multi-modal model parameters, which correspond to a minimum of the parametric functional, by solving a minimization problem for the parametric functional using linear and/or nonlinear optimization methods.

9. The system of claim 8, wherein the one or more sensors comprise a plurality of sensors arranged in an array on the surface or within the examined medium.

10. The system of claim 8, wherein the one or more sensors comprise seismic, electric, magnetic, gravity, acoustic, temperature field sensors.

11. The system of claim 8, wherein the one or more sensors comprise optical, electromagnetic, elastic, radio waves, x-ray, magnetic resonance, ultrasound, electrical, and radionuclide sensors.

12. The system of claim 8, wherein the measured data and or images are input into the processor of the computing system, and the processor includes executable instructions to:
a. numerically calculate the nonnegative joint entropy functional equal to a joint weighted average of the logarithm of the corresponding density of the at least two model parameters and/or their attributes;
b. numerically calculate the smoothing or focusing stabilizing functionals for producing smooth inverse images or the images with sharp boundaries;
c. numerically calculate the parametric functional defined as a linear combination of the misfit functionals for the at least two datasets, the smoothing or focusing stabilizing functional, and the nonnegative joint entropy functional introduced above; and
d. numerically determine the multi-modal model parameters, which correspond to the minimum of the parametric functional, by solving the minimization problem for the parametric functional using the linear and/or nonlinear optimization methods.

13. The system of claim 12, wherein the nonnegative joint entropy functional is equal to the joint weighted average of the logarithm of the corresponding density of the spatial gradients of the at least two model parameters and/or their attributes.

14. A method for simultaneous imaging of different physical properties of an examined medium from multi-physics datasets, the method comprising:
receiving a plurality of measured parameters from a plurality of corresponding sensors, the plurality of sensors measuring at least two different measured parameter types;
determining a nonnegative joint entropy functional of at least two model parameters corresponding to the plurality of measured parameters, wherein the nonnegative joint entropy functional is the measure of joint disorder or uncertainty in the distribution of the at least two model parameters and/or their attributes and is the measure of joint disorder or uncertainty in a distribution of spatial gradients of the at least two model parameters and/or their attributes;

determining stabilizing functionals for the at least two model parameters;

determining misfit functionals between the at least two different measured parameters and corresponding predicted geophysical data;

constructing a parametric functional, the parametric functional being a linear combination of the misfit functionals, the stabilizing functionals, and the nonnegative joint entropy functional; and determining multi-modal model parameters corresponding to a minimum of the parametric functional by solving a minimization problem for the parametric functional.

15. The method of claim 14, wherein the plurality of measured parameters generate a first image of the examined medium, and further comprising generating a second image of the examined medium using the multi-modal model parameters, the second image having a higher resolution than the first image.

* * * * *